United States Patent Office 3,833,712
Patented Sept. 3, 1974

3,833,712
ANTI-POLLUTION BY-PRODUCT FROM
PHENOLIC CONTAMINANTS
Edgar Bradbury Baker, Springfield, Oreg., assignor to
Borden, Inc., Columbus, Ohio
No Drawing. Filed Aug. 25, 1972, Ser. No. 283,920
Int. Cl. C08g 51/24
U.S. Cl. 423—245                    4 Claims

ABSTRACT OF THE DISCLOSURE

Atmospheric pollution by volatile phenolic contaminants in industrial effluent gas streams is substantially reduced by absorbing said contaminants in an aqueous solution of a water-soluble alkaline phenolformaldehyde resin, condensing the mixture of absorbing resin and absorbed contaminants to form an augmented resin, optionally repeating the absorbing and recondensing steps finally to form a useful by-product resin suitable as a component of an adhesive.

BACKGROUND OF THE INVENTION

Many industrial processes which employ phenol or low-condensed phenolic resins are confronted with toxicity and odor problems arising from the evolution of phenol and phenol-derived volatile substances into air. Low molecular weight phenolic resins in particular can evolve considerable amounts of such phenolic substances during their transfer, drying or curing, either by themselves or in products incorporating them. Particular industries which are troubled by this problem include those concerned with the manufacture of mineral or glass wool products, separators for lead storage batteries, various laminated products using phenolic adhesives, and the like.

Attempts have been made to reduce phenolic air pollution by removing the undesirable substances as solutions in water or other solvents, but such dilution is not a real answer. It merely converts an air-pollution problem into a water-pollution or liquid-pollution problem. Nor is it satisfactory to resort to the common disposal method involving combustion of the effluent gases from a production unit; this is uneconomical and in addition squanders scarce resources such as natural gas.

SUMMARY OF THE INVENTION

I have now found a method for substantially reducing atmospheric pollution caused by contaminative volatile phenolic substances in industrial effluent gas streams while simultaneously preparing a by-product resin useful, exemplarily, as an adhesive component.

In short, the method of this invention comprises the steps of (a) absorbing said volatile phenolic substances in an aqueous solution of a water-soluble alkaline phenolformaldehyde resin, (b) condensing the mixture comprising said resin and absorbed phenolic substances to form an augmented resin solution, and optionally (c) recycling the augmented resin solution as an absorbent for the further prevention of pollution by contaminative volatile phenolic substances, repeating steps (a) and (b) several times, and (d) using the product of the final condensation step as a by-product resin.

DETAILED DESCRIPTION OF THE INVENTION

The resins to be used as absorbents in carrying out the instant invention can be any alkaline phenol/formaldehyde resin such as made by condensing from about 15 to 2.5 mols of formaldehyde per mol of phenol. Single stage resins are preferred and the condensation should be carried out sufficiently to reduce the phenol volatility of the absorbent resin itself to a level which is substantially negligible. Methods for preparing suitable absorbent resins are described in Examples I and III below.

Any equipment suitable for scrubbing volatile gases with liquids can be used to effect the absorbent step of this invention, including columns, venturi devices and the like. Exemplarily, concurrent, cross-current and counter-current flow can be used to contact the gas and liquid phases. A cyclone or similar apparatus can be employed to minimize release of resin mist to the atmosphere.

A scrubber can be initially charged with an aqueous solution containing between about 10% and 35% resin solids at a pH between about 10 and 12.5. The scrubber can be a single batch scrubber, or alternatively, several scrubbers can be used in series.

The absorptive efficiency of each scrubber will, of course, depend on factors such as temperature, contact period, resin composition, gas composition, rate of gas flow and size of gas bubbles. In general, the objective would be to remove volatile phenolics, which can be present in effluent gases in concentrations up to 100–200 p.p.m. or higher, sufficiently to reduce this phenolic concentration to around 5 to 30 p.p.m., by volume measured at 25° C. and 760 mm. pressure. Such reduction can be considered adequate in certain intermittent situations, inasmuch as industrial hygienists have stated that nearly all workers can be exposed repeatedly to an air concentration of phenol amounting to 5 p.p.m. by volume without adverse effect. However, concentrations less than 5 p.p.m. can be reached by using sufficient plurality of scrubbers in the series or alternatively by using a terminal absorber such as activated charcoal or the like.

When a single batch scrubber is used it would be replaced as soon as the phenolic level of the gas leaving the scrubber reached an allowable maximum. Alternatively, a continuous process can be used wherein some of the exhausted resin is incrementally replaced by fresh resin. Continuous concurrent, cross-current or counter-current methods of scrubbing can be applied.

Various modifications and procedures will occur to those skilled in the art of engineering design and procedure. For instance, as the phenolic level increases in the absorbing solution with concomitant increase in its escaping tendency, this can be partly counteracted by dilution or by reduction in temperature. But periodic replacement, either incremental or continuous, will, in general, be required.

A particularly effective modification of this invention contemplates the use of a plurality of scrubbers in series. When the gas reaching the atmosphere from this series of scrubbers is found by analysis to have reached a contaminant level above that decided upon as not to be exceeded as, for example, 10 parts per million or less (by volume) of phenolics, the scrubber unit closest to the entering effluent gas is removed from the train, the passage of effluent gas being connected directly with the second scrubber in the series and a fresh scrubber unit being connected at the outlet end of the train. Thus, the scrubber unit closest to the entrance of the contaminating effluent gas is periodically circumvented and disconnected while an uncontaminated fresh absorbent unit is placed at the end of the train.

The method of the instant invention is chiefly illustrated herein as applied to the volatile phenolics characterized by their ability to couple with 4-amino-antipyrine in the Gibbs colorometric analytical procedure, such as described in ASTM D1783. (See also "Standard Methods—Water and Wastewater" 12th Ed. APHA-AWWA-WPCF. Boyd Printing.) However, it is obvious that more sophisticated methods of analysis procedures can be applied to assure the capture of other moieties as well. Thus, an analysis for formaldehyde could be included. The method of this invention has been found effective in simultaneously capturing formaldehyde along with phenolic volatiles and the trapped formaldehyde is conveniently and economically useful in carrying forth the condensation of the trapped phenolics to make an augmented phenolic resin capable of further effective use as an absorbent and eventually after several such recondensations the plurally augmented resin is useful as a by-product, exemplarily, in adhesives.

The term "augmented resin" as used herein is meant to designate the resinous product resulting from the treatment of a mixture of a phenol formaldehyde resin which has been used as an absorbent together with volatile phenolic substances absorbed, whereby the volatile substances are condensed into an integral part of the resin.

The purpose of forming an augmented resin is twofold. In the first place, particularly when the product is to be recycled as an absorbent for effluent contaminants, the captured volatiles must be coupled in to a less volatile form. Secondly, it is desirable to accomplish such coupling in a form which leaves the overall product in a sufficiently non-advanced state to be a useful intermediate resin in adhesive applications and the like.

Thus, the coupling of the captured phenolic volatiles into the resin can be achieved by any conventional resin-making procedure. In certain cases, the dual purpose of the augmenting step can be carried out simply and directly by heating the mixture without addition of other materials. In general, however, it will be desirable to adjust the overall composition. As will readily be understood by those trained in the art of phenolic resin manufacture, adjustments in formaldehyde, alkali and other additives can be made to encourage methylol formation rather than resin advancement.

This invention will be further illustrated by description in connection with the following specific examples of the practice of it wherein, as also elsewhere herein, proportions are in parts by weight unless stated otherwise.

EXAMPLE I

This example illustrates the preparation of an absorbing Resin A which is suitable for dephenolating gas streams.

A suitable reactor equipped with means of stirring, heating and cooling is charged with 34.4 parts by weight 87% aqueous phenol, 32.1 parts 50% aqueous formaldehyde and 15.8 parts water. After thorough mixing, there is added 8.1 parts of 50% aqueous sodium hydroxide. External cooling is required to take care of the substantial heat of reaction. The batch is allowed to come to 90° C. and held there til the Gardner viscosity is "I" measured at 25° C. Cooling is then carried out in a manner such as to advance the viscosity about one Gardner unit every three minutes. There is added 9.6 parts of 50% aqueous sodium hydroxide after a Gardner "Q" has been reached and the temperature is adjusted to 85° C. The temperature is controlled to reach an endpoint of Gardner "R slight minus" at about 83° C. and the batch is then cooled rapidly to room temperature. The Resin A typically has a solids content of 47–49%, a titratable alkalinity of 8.7–9.1% sodium hydroxide and a Brookfield viscosity of 500–700 cps. This resin is characterized by a long storage life.

EXAMPLE II

This example illustrates the efficacy of Resin A as absorbent for effluent phenol gas.

A cellulose pulp sheet was saturated with a 2% aqueous phenol solution and placed in an insulated Erlenmeyer flask. This flask was equipped with an entrance tube extending to the flask bottom and an exit tube at the top. The exit tube was connected with a cylindrical scrubber equipped with a bubbler and containing 250 grams of Resin A, prepared as described in Example I, diluted in Example I, diluted with 125 grams of water, followed by a similar scrubber containing 150 milliliters of chloroform as a trap. This chloroform trap was cooled to minus 3° C. by means of ice and aqueous methanol. The flask containing the phenol-saturated sheet was heated to 192° C. over a period of 20 minutes while air was forced through the system at the rate of about one liter (measured through a flowmeter at 20° C.) per minute. For at least 10 minutes of the 20 minute period, the temperature of the flask was above 180° C.

It was first established in a "blank" run that the chloroform trap would effect substantially quantitative recovery of the effluent phenol. The scrubber containing Resin A was omitted from the train, the Erlenmeyer flask was charged with sufficient aqueous phenol on the pulp sheet to correspond to 7.7 mg. of pure phenol, and air was passed through the system under the conditions outlined in the preceding paragraph. At the end of the run, the pulp sheet was extracted with chloroform. The chloroform was then carefully evaporated in the presence of 25 mls. of water and an aliquot of the water was analyzed for phenol by the above cited 4-amino-antipyrine colorimetric method. The phenol contained in the chloroform trap was likewise analyzed. The results corresponded to 1.8 mgs. of phenol remaining on the sheet and the amount of phenol absorbed by the trap being 5.7 mgs. in agreement within experimental error with 7.7−1.8=5.9 mgs. evolved.

It was also established that when the Erlenmeyer flask contained no phenol and the warm pure air was passed through the train, including both Resin A scrubber and chloroform trap, substantially no phenol was removed from Resin A into the chloroform trap.

The efficacy of Resin A as absorbent was then tested by using the complete train including phenol-treated pulp, Resin A scrubber and chloroform trap. After the passage of 22.5 liters of air (as measured at 20° C.) it was found that 7.7−1.3=6.4 mgs. of phenol were evolved, corresponding to about 76 p.p.m. by volume at 25° C. and atmospheric pressure. The phenol not absorbed by the Resin A and recovered in the chloroform trap was 0.8 mg. Thus the Resin A scrubber removed about seven-eighths of the effluent phenol leaving an amount corresponding to about 9.5 p.p.m. in the air.

EXAMPLE III

This example illustrates the preparation of an alternative absorbent, Resin B.

A reactor as in Example I is charged with 28.8 parts by weight of 87% aqueous phenol, 32.2 parts of 50% aqueous formaldehyde and 11.3 parts of water. The stirred mixture is heated to 90° C. and 7.1 parts of 50% aqueous sodium hydroxide is charged over a period of about 13 minutes while maintaining cooling to keep the system at about 90° C. Condensing at about 90° C. is continued to a Gardner "S" measured at 25° C. Five minutes later, an additional 7.1 parts of 50% aqueous sodium hydroxide is charged over a period of about eight minutes, still at 90° C. The batch is then cooled to 86–87° C. and condensed at this temperature to Gardner "V." Fifteen minutes later 13.5 parts of water is added, followed by rapid cooling to room temperature. This Resin B typically has a total solids of about 42%, a pH of 11.5–12.0 and a Brookfield viscosity of 100–200 cps. at 25° C.

EXAMPLE IV

This example illustrates the use of Absorbent Resin B to decontaminate an air stream arising from the drying and curing of a low condensed one-stage phenolic resin.

The Resin R to be cured was made by using the following procedure:

475 grams of 87% phenol (USP phenol diluted with water), 450 grams of 50% aqueous formaldehyde, and 20 grams of 50% aqueous sodium hydroxide are charged to a vessel that is fitted for mixing, heating and cooling. The batch is heated to 75° C., interspersed with some cooling to control the exothermic reaction, and held at this temperature for one hour. Then the temperature is reduced to about 70° C. At this lower temperature the resin is sampled periodically, and its dilutability is checked with 2.5% sulfuric acid. As the resin condenses, its compatibility with acid diminishes. It is reacted until a haze develops when one volume is diluted with 4–6 volumes of dilute acid at 25° C. Fifty grams of water are charged, and the resin is cooled rapidly. It is neutralized to a pH of 6.8–7.0 with 18% hydrochloric acid. The finished resin has a dilutability with water at 25° C. of 8–12 volumes of water per volume of resin. If a one gram sample is weighed into a depression in a small aluminum pan that is heated for 1¾ hours @ 125° C. in a circulating oven, then a resin solids of 50–52% is obtained.

The generation of effluent gas during heating of Resin R was studied using a train as in Example II except that the Erlenmeyer flask was replaced by a ceramic combustion tube, heated by a heating tape and containing a thermocouple.

A portion of Resin R was diluted to 20% solids with water and a pulp sheet was saturated therewith and introduced in a porcelain sample boat into the ceramic tube. Omitting the resin scrubber, but using a chloroform trap containing about 125 mls. of chloroform at about 0° C. in a cylinder with liquid depth about 10 cms., the combustion tube was heated over a period of 8½ minutes to reach a temperature of 400° F. followed by a residence time of 15 minutes at this temperature. During this drying and curing period, air was flowing through a glass sparger at a liter per minute. Gibbs analysis for "phenol" showed that 10.4 parts of phenol equivalent per 100 parts of solids (by weight) were evolved into the air streams under the stated conditions of time, temperature and rate of air flow. The amount of "phenol" trapped in the chloroform was equivalent to 5.0 mgs.

The decontamination of such an air stream was carried out using about 110 mls. of a 12% solids aqueous dilution of Absorbent Resin B, prepared as described in Example III, in a scrubbing cylinder with liquid depth of about 11 cms. and a gas bubbler tip of about 0.2 cm. diameter. A pulp sheet was again saturated with a 20% solids aqueous solution of Resin R as in the "blank" experiment described in the preceding paragraph. In a corresponding run, again heating for 23.5 minutes, fifteen minutes of which was at 400° F. and with air flow again at one liter per minute, 4.9 mg. "phenol" was absorbed in the Resin B scrubber at 22° C.; only 0.1 mg. escaped the scrubber and was recovered in the chloroform.

In a second run using an air flow rate of 0.4 liter per minute and a total heating time of 30 minutes with 15 minutes at 400° F., 4.8 mgs. of phenol were found to be evolved in the absence of scrubbing. When a Resin B scrubber was interposed, it was found that 4.7 mgs. were absorbed by the scrubber, only 0.1 mg. being recovered in the chloroform.

EXAMPLE V

This example illustrates cyclic alternating use of a phenolic resin solution as absorbent for phenolic contaminants and its successive condensation to an augmented resin.

The contamination of Resin B was simulated by adding 29 grams of 87% aqueous phenol, 29 grams of salicyl alcohol and 85 grams of an aqueous solution containing 37% formaldehyde and 7% methanol, to a mixture of 485 grams water and 400 grams of 42% solids Resin B, prepared as in Example II.

After thorough mixing, a sample was reserved to check the efficiency of this composition in purifying air contaminated with phenolics. Using the absorption train procedure described in the above examples, the entering air stream carried 5.1 mgs. (55 p.p.m.) of phenolics but only 2.1 mgs. were removed at 21° C. in the scrubber containing the contaminated Resin B, leaving about 30 p.p.m. residual in the exit gas.

The remainder of the mixture was heated to 60° C., held there for four hours and cooled to room temperature. After this reaction the solids were 26.4% and the viscosity was low. This augmented resin is designated as Resin B'.

A portion of the B' resin was again "contaminated" in the following proportions:

|  | Grams |
|---|---|
| Resin B' | 760 |
| 87% aqueous phenol | 20 |
| 50% aq. sodium hydroxide | 10 |
| Salicyl alcohol | 20 |
| 37% formaldehyde/7% methanol in water | 60 |
| Water | 150 |

After mixing these materials, a sample was retained which was shown to capture at 21° C. only 2.0 mgs. out of 5.0 mgs. of "phenol" in a contaminated air stream.

The balance of the contaminated Resin B' was reacted at 60° C. for six hours, after which it was found to remove 4.6 mgs. out of 5.2 mgs. of "phenol."

Two more cycles were added to this recycle system with lesser amounts of phenolic contamination. These cycles were of this type:

|  | Grams |
|---|---|
| Recycle resin | 750 |
| 87% aq. phenol | 10 |
| Sodium hydroxide, 50% aq. | 10 |
| Salicyl alcohol | 10 |
| 37% formaldehyde/7% methanol, aq. | 30 |
| Water | 150 |

Before reaction, the resins removed an average of 3.7 out of 5.2 mgs. of phenolics leaving a residue of an average of 17 p.p.m. After reacting at 60° C. for four hours, the volatile phenolics were condensed to resins removing an average of 4.15 mgs. phenolics out of an effluent level of 4.5 mgs. corresponding to an exit level of 4 p.p.m.

It will be understood that it is intended to cover all changes and modifications of the examples of the invention herein chosen for the purpose of illustration which do not constitute departures from the spirit and scope of the invention.

What is claimed is:

1. A method for reducing atmospheric pollution by contaminative volatile phenol in industrial effluent gas streams, which method comprises passing the effluent gas stream containing said phenol through an absorber, absorbing the phenol in an aqueous solution of a water-soluble alkaline phenol-formaldehyde resin then releasing the effluent gas stream substantially freed of volatile phenolic substance to the atmosphere.

2. The method of Claim 1 wherein the phenol-formaldehyde resin and the phenol absorbed therein is subsequently condensed forming an augmented resin solution.

3. The method of Claim 2 wherein said augmented resin solution is recycled as an absorbent for the further reduction of pollution by contaminative phenol.

4. A method for reducing atmospheric pollution by contaminative volatile phenol in industrial effluent gas streams while simultaneously preparing a by-product resin useful as an adhesive component, which method comprises the steps of (a) passing the effluent gas stream containing said phenol through an absorber containing an aqueous solution of a water-soluble alkaline phenol-formaldehyde resin.

(b) condensing the resin and the absorbed phenol to form an augmented resin solution, (c) recycling the augmented resin solution as an absorbent for the further reduction of pollution by contaminative volatile phenolic substances, (d) optionally repeating steps (b) and (c) several times, and (e) carrying out a final condensation step as in (b) to form said by-product resin.

References Cited

UNITED STATES PATENTS

| | | | |
|---|---|---|---|
| 1,994,714 | 3/1935 | Johnson et al. | 260—57 R |
| 2,750,354 | 6/1956 | Merriam | 260—57 R |
| 3,308,096 | 3/1967 | Ivanov et al. | 260—57 R |
| 3,655,047 | 4/1972 | Adegeest | 260—57 A |
| 3,736,292 | 5/1973 | Thayer et al. | 260—57 R |

LORENZO B. HAYES, Primary Examiner

U.S. Cl. X.R.

260—29.3, 57 R

UNITED STATES PATENT OFFICE
CERTIFICATE OF CORRECTION

Patent No. 3,833,712                    Dated September 3, 1974

Inventor(s) Edgar Bradbury Baker

It is certified that error appears in the above-identified patent and that said Letters Patent are hereby corrected as shown below:

Column 1, line 68 "15" should be "1.5"

Column 3, line 74 "cyclindrical" should be "cylindrical"

Column 4, line 2 delete "diluted in Example I,".

Signed and sealed this 26th day of November 1974.

(SEAL)
Attest:

McCOY M. GIBSON JR.                C. MARSHALL DANN
Attesting Officer                  Commissioner of Patents